United States Patent
Kang et al.

(10) Patent No.: US 9,059,476 B2
(45) Date of Patent: Jun. 16, 2015

(54) ELECTROLYTE FOR LITHIUM SECONDARY BATTERY AND LITHIUM SECONDARY BATTERY INCLUDING THE SAME

(75) Inventors: Yoon-sok Kang, Seongnam-si (KR); Seok-soo Lee, Yongin-si (KR); Young-gyoon Ryu, Suwon-si (KR); Jin-hwan Park, Seoul (KR); Mi-jeong Song, Suwon-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 960 days.

(21) Appl. No.: 13/171,508

(22) Filed: Jun. 29, 2011

(65) Prior Publication Data

US 2012/0121990 A1    May 17, 2012

(30) Foreign Application Priority Data

Nov. 16, 2010    (KR) .......................... 10-2010-0113900

(51) Int. Cl.
*H01M 10/056* (2010.01)
*H01M 10/052* (2010.01)
(Continued)

(52) U.S. Cl.
CPC ........ *H01M 10/052* (2013.01); *H01M 10/0567* (2013.01); *H01M 10/0569* (2013.01); *Y02T 10/7011* (2013.01); *Y02E 60/122* (2013.01)

(58) Field of Classification Search
CPC .......... H01M 10/056; H01M 10/0567; H01M 10/0569; Y02T 10/7011; Y02E 60/122
See application file for complete search history.

(56) References Cited

U.S. PATENT DOCUMENTS

| | | | |
|---|---|---|---|
| 2005/0118512 A1* | 6/2005 | Onuki et al. | 429/326 |
| 2005/0147883 A1* | 7/2005 | Kubota | 429/213 |
| 2008/0241704 A1* | 10/2008 | Abe et al. | 429/341 |

(Continued)

FOREIGN PATENT DOCUMENTS

| | | |
|---|---|---|
| JP | 8-175810 | 7/1996 |
| JP | 10-21958 | 1/1998 |

(Continued)

OTHER PUBLICATIONS

Abe et al., "Functional Electrolyte: Additives for Improving the Cyclability of Cathode Materials," Electrochemical and Solid State Letters, 7, (12), A462-A465 (2004).*

(Continued)

*Primary Examiner* — Ula C Ruddock
*Assistant Examiner* — Amanda Barrow
(74) *Attorney, Agent, or Firm* — Cantor Colburn LLP

(57) ABSTRACT

An electrolyte for a lithium secondary battery, the electrolyte comprising: a lithium salt, a non-aqueous organic solvent, and an additive represented by Formula 1 below:

[Formula 1]

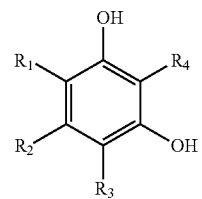

wherein $R_1$, $R_2$, $R_3$, and $R_4$ are the same as defined in the detailed description.

6 Claims, 4 Drawing Sheets

(51) Int. Cl.
*H01M 10/0567* (2010.01)
*H01M 10/0569* (2010.01)

(56) References Cited

U.S. PATENT DOCUMENTS

| | | | | |
|---|---|---|---|---|
| 2009/0155696 | A1* | 6/2009 | Lee et al. | 429/337 |
| 2010/0136426 | A1* | 6/2010 | Merritt et al. | 429/200 |
| 2010/0183926 | A1* | 7/2010 | Kim et al. | 429/338 |

FOREIGN PATENT DOCUMENTS

| | | | |
|---|---|---|---|
| JP | 10-247517 | | 9/1998 |
| JP | 11-73991 | | 3/1999 |
| JP | 2000-21444 | | 1/2000 |
| JP | 2000-268858 | | 9/2000 |
| JP | 2000-268858 A | | 9/2000 |
| JP | 2001-6731 | | 1/2001 |
| JP | 2001-15157 | | 1/2001 |
| JP | 2003-272700 A | | 9/2003 |
| JP | 2004-119307 | * 4/2004 | ............ H01M 10/40 |
| JP | 2004119307 A | | 4/2004 |
| JP | 2008-34233 | | 2/2008 |
| KR | 1020010027112 A | | 4/2001 |
| KR | 10-1999-0038697 | * 9/2006 | ............ H01M 10/05 |
| KR | 10-0625957 | | 9/2006 |

OTHER PUBLICATIONS

Patent Abstracts of Japan—Publication No. 2000-264565.
Korean Patent Abstracts—Publication No. 1020010027112.
Shiro Kobayashi et al., "Oxidative polymerization of phenols revisited", Prog. Polym. Sci. 28 (2003) pp. 1015-1048.
Koji Abe et al., "Functional Electrolyte: Additives for Improving the Cyclability of Cathode Materials", *Electrochemical and Solid-State Letters*, 7 (12), pp. A462-A465 (2004).
Korean Office Action with English Translation for Application No. 10-2010-0113900 dated Oct. 23, 2012.

* cited by examiner

ELECTROLYTE FOR LITHIUM SECONDARY BATTERY AND LITHIUM SECONDARY BATTERY INCLUDING THE SAME

CROSS-REFERENCE TO RELATED APPLICATIONS

This application claims the benefit of Korean Patent Application No. 10-2010-0113900, filed on Nov. 16, 2010 in the Korean Intellectual Property Office, the disclosure of which is incorporated herein in its entirety by reference.

BACKGROUND

1. Field

Aspects of the present disclosure relate to electrolytes for lithium secondary batteries and lithium secondary batteries including the same, and more particularly, to electrolytes that are used for lithium secondary batteries which, when used in a lithium secondary battery, improve high-temperature lifetime characteristics and high-temperature capacity conservation characteristics of the battery.

2. Description of the Related Art

Lithium secondary batteries are rechargeable, and the energy density per unit weight thereof is three or more times greater than that of conventional lead storage batteries, nickel-cadmium batteries, nickel-hydrogen batteries, or nickel-zinc batteries. In addition, the charging rates of lithium secondary batteries are high. Due to such features, research and development of lithium secondary batteries are actively being performed.

Generally, a lithium secondary battery includes a cathode, an anode, and a separator and an electrolyte which are interposed between the cathode and the anode. Among these components, the electrolyte may further include a small amount of additive to improve performance of the lithium secondary battery, while retaining physical properties of the electrolyte. This additive addition method is drawing attention.

The additive has various functions. For example, the additive may form a solid electrolyte interface (SEI) for preventing direct contact between an electrode active material and the electrolyte. Additives for forming a SEI on the surface of an electrode can be classified as an anode additive for aiding formation of an SEI on the surface of graphite and an overcharge protection (OCP) additive for forming a film on the surface of a cathode.

The recent increasing demand for lithium secondary batteries having high energy density, for example, batteries for electric vehicles, has led to research into high voltage cathode active materials. However, research into an electrolyte additive for preventing oxidation of an electrolyte occurring at the surface of a cathode active material, has not yet been implemented.

In general, the potential window of an electrolyte needs to be wider than that between a cathode active material and an anode active material. However, in order to increase the energy density of a battery, an active material for high voltage has been used. Thus, the potential window of the electrolyte has become narrower than that between a cathode active material and an anode active material. Accordingly, decomposition of the electrolyte may be prevented by forming a film for preventing direct contact between the electrolyte and an electrode active material.

If a conventional aromatic compound, such as biphenyl or isomers of terphenyl are used as electrolyte additives, the electrolyte additive performs OCP by forming a thick film at the surface of the cathode when the voltage of the battery is equal to or higher than a reference voltage value so as to block passage of lithium ions and current flow. Recently, a method of forming a film at the surface of a cathode by using a low concentration of an additive has been introduced. However, the battery characteristics obtained were not satisfactory.

SUMMARY

Aspects of the present invention provide electrolytes that are used in lithium secondary batteries, prevent oxidation of the electrolytes at the surface of a cathode, and enable passage of lithium ions by forming a polar film at the cathode surface.

Aspects of the present invention provide methods and apparatuses for lithium secondary batteries having excellent high-temperature lifetime characteristics and high-temperature capacity conservation characteristics.

Additional aspects and/or advantages of the invention will be set forth in part in the description which follows and, in part, will be obvious from the description, or may be learned by practice of the invention.

An aspect of the present invention provides an electrolyte for a lithium secondary battery, the electrolyte comprising: a lithium salt, a non-aqueous organic solvent, and an additive represented by Formula 1 below:

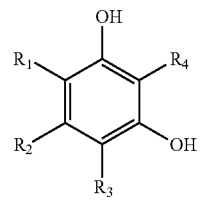

[Formula 1]

where $R_1$, $R_2$, $R_3$, and $R_4$ are each independently a hydrogen atom, a halogen element, a hydroxyl group, —N(R)(R') (R and R' are each independently a hydrogen atom, a C1-C10 alkyl group, or a C6-C20 aryl group), an ester group, a carbonate group, a carbonyl group, a nitro group, a cyano group, a thio group, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a C2-C20 alkylene oxide group, a substituted or unsubstituted C3-C30 cycloalkyl group, a substituted or unsubstituted C6-C30 aryl group, a substituted or unsubstituted C6-C30 aryloxy group, a substituted or unsubstituted C6-C30 heteroaryl group, or a combination thereof.

In the additive of Formula 1, at least one of $R_1$, $R_2$, $R_3$, and $R_4$ may be a hydroxyl group.

The additive may be 1,3-benzene diol (resorcine) resorcinol, phloroglucinol or 1,2,4-benzene triol.

An amount of the additive is in a range of about 0.001 to about 3 wt % based on the total weight of the electrolyte.

Another aspect of the present invention provides a lithium secondary battery including: a cathode; an anode; and the electrolyte described above.

Another aspect of the present invention provides a lithium secondary battery including: a cathode; an anode; and an electrolyte, wherein the electrolyte is the electrolyte described above and the cathode comprises a film formed at a surface of the cathode, wherein the film is derived from either a portion of the additive or the entire additive.

Another aspect of the present invention provides that the film is an oxidative polymerization product of the additive.

A thickness of the film is in a range of about 0.05 nm to about 100 nm.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Figure 1:
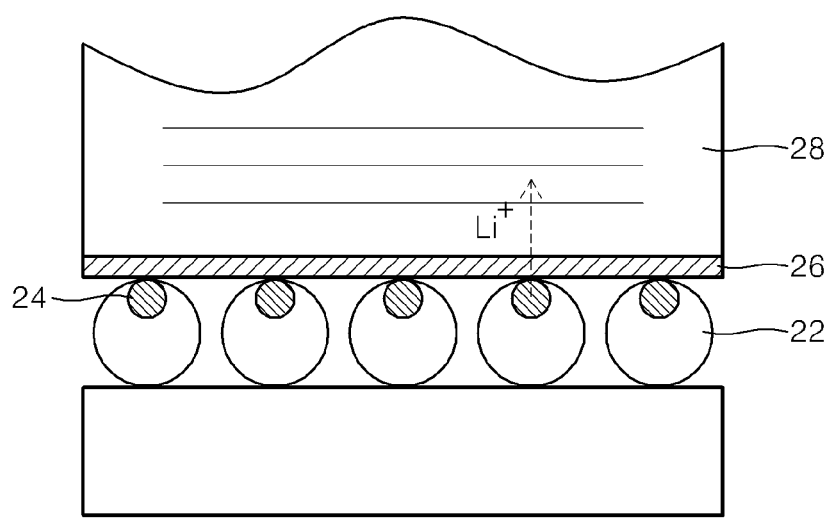
FIG. 1 is a schematic view illustrating a solid electrolyte interface (SEI) film formed at the surface of a cathode, when an additive for a lithium secondary battery according to an embodiment of the present invention is used.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

An electrolyte for a lithium secondary battery according to an embodiment of the present invention includes a lithium salt, a non-aqueous organic solvent, and an additive, wherein the additive is represented by Formula 1 below:

[Formula 1]

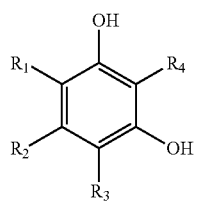

where $R_1$, $R_2$, $R_3$, and $R_4$ are each independently a hydrogen atom, a halogen element, a hydroxyl group, —N(R)(R') (R and R' are each independently a hydrogen atom, a C1-C10 alkyl group, or a C6-C20 aryl group), an ester group, a carbonate group, a carbonyl group, a nitro group, a cyano group, a thio group, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a C2-C20 alkylene oxide group, a substituted or unsubstituted C3-C30 cycloalkyl group, a substituted or unsubstituted C6-C30 aryl group, a substituted or unsubstituted C6-C30 aryloxy group, a substituted or unsubstituted C6-C30 heteroaryl group, or a combination thereof.

The lithium salt used in the electrolyte may be dissolved in an organic solvent and used as a provider for lithium ions, thereby enabling basic operation of a lithium secondary battery and promoting flow of lithium ions between a cathode and an anode. The lithium salt may be any one of various materials that are conventionally used in a lithium battery.

Examples of the lithium salt include $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ where x and y are natural numbers, LiCl, LiI, lithium bisoxalate borate, and a combination thereof. The lithium salt may also be used as a supporting electrolytic salt.

The concentration of the lithium salt may be within a concentration range generally used in the art. For example, the concentration of the lithium salt in the electrolyte may be in a range of about 0.1 to about 2.0 M. When the concentration of the lithium salt is within the range described above, the concentration of the electrolyte may be appropriately maintained to improve performance of the electrolyte and the viscosity of the electrolyte may be appropriately maintained to improve mobility of lithium ions.

The non-aqueous organic solvent included in the electrolyte may act as a medium through which ions participating in an electrochemical reaction of a battery migrate. The non-aqueous organic solvent may be any one of various materials that are conventionally used in the art. Examples of the non-aqueous organic solvent include a carbonate-based solvent, an ester-based solvent, an ether-based solvent, a ketone-based solvent, an alcohol-based solvent, a non-protonic solvent, and a combination thereof.

The substituents used in Formula 1 may be defined as follows.

The term "an ester group" used in Formula 1 refers to a group represented by —COOR; the term "a carbonate group" used in Formula 1 refers to a group represented by —OCO(OR); and the term "a carbonyl group" used in Formula 1 refers to a group represented by —COR. In this regard, R is a hydrogen atom, a C1-C10 alkyl group, or a C6-C20 aryl group.

The term "substituted" in the "substituted alkyl group, alkoxy group, alkenyl group, alkynyl group, alkylene oxide group, cycloalkyl group, aryl group, aryloxy group, and heteroaryl group used in Formula 1 means substitution with a halogen atom, a C1-C20 alkyl group substituted with a halogen atom (for example, $CCF_3$, $CHCF_2$, $CH_2F$, $CCl_3$, etc.), a hydroxyl group, a nitro group, a cyano group, an amino group, an amidino group, a hydrazine group, a hydrazone group, a carboxyl group or a salt thereof, a sulfonic acid or salt thereof, a phosphoric acid or salt thereof, or a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl, or a C6-C20 heteroarylalkyl group.

Examples of a C1-C20 alkyl group used in Formula 1 include methyl, ethyl, propyl, isobutyl, sec-butyl, tert-butyl, neo-butyl, iso-amyl, and hexyl, and at least one hydrogen atom in the alkyl group may be substituted with the substituents used where the term "substituted" is defined above.

Examples of a C1-C20 alkoxy group used in Formula 1 include methoxy, ethoxy, and propoxy, and at least one hydrogen atom in the alkoxy group may be substituted with the substituents used where the term "substituted" is used as defined above.

Examples of a C2-C20 alkenyl group used in Formula 1 include vinylene and allylene, and at least one hydrogen atom in the alkenyl group may be substituted with the substituents used where the term "substituted" is used as defined above.

Examples of a C2-C20 alkynyl group used in Formula 1 include acetylene, and at least one hydrogen atom in the alkynyl group may be substituted with the substituents used where the term "substituted" is used as defined above.

Examples of a C2-C20 alkylene oxide group used in Formula 1 include ethylene oxide, propylene oxide, and butylene oxide, and at least one hydrogen atom in the alkylene group may be substituted with the substituents used where the term "substituted" is used as defined above.

Examples of a C3-C30 cycloalkyl group used in Formula 1 include cyclopropyl, cyclobutyl, cyclopentyl, and cyclohexyl, and at least one hydrogen atom in the cycloalkyl group may be substituted with the substituents used where the term "substituted" is used as defined above.

A C6-C30 aryl group used in Formula 1 refers to an aromatic system containing one or more rings, in which the aromatic system is used alone or in combination, and examples of the C6-C30 aryl group include phenyl, naphthyl, and tetrahydronaphthyl. Also, at least one hydrogen atom in the aryl group may be substituted with the substituents used where the term "substituted" is used as defined above.

Examples of the C6-C30 aryloxy group used in Formula 1 include phenoxy, and at least one hydrogen atom in the aryloxy group may be substituted with the substituents used where the term "substituted" is used as defined above.

The C6-C30 heteroaryl group used in Formula 1 refers to an organic compound containing one or more hetero atoms selected from N, O, P, and S, in which the remaining ring atoms are carbon atoms, and examples of the C6-C30 heteroaryl include pyridyl. Also, at least one hydrogen atom in the heteroaryl group may be substituted with the substituents used where the term "substituted" is used as defined above.

FIG. 1 is a schematic view illustrating a solid electrolyte interface (SEI) film 26 formed at the surface of a cathode, when an additive for a lithium secondary battery according to an embodiment of the present invention is added to an electrolyte 28.

Referring to FIG. 1, when an additive for a lithium secondary battery according to an embodiment of the present invention is added to the electrolyte 28, the SEI film 26, which is thin and strong, is formed on a cathode active material 22, which forms a surface portion of a cathode, thereby enabling lithium ions 24 to effectively migrate from the cathode to the electrolyte 28.

In detail, the additive of Formula 1 has a benzene ring containing two or more —OH groups, which are oxidation-polymerized to form the thin and strong SEI film 26 illustrated in FIG. 1. Thus, oxidation of the electrolyte 28 is prevented and conductivity of lithium ions and high-temperature lifetime characteristics are improved.

In the additive of Formula 1, at least one of $R_1$, $R_2$, $R_3$, and $R_4$ may be a hydroxyl group.

The additive generally has three or more —OH groups in the benzene ring and thus has a stronger polarity, thereby enabling easier passage of lithium ions from a cathode to an electrolyte. Thus, a battery including the additive has good high-temperature lifetime characteristics and high-temperature capacity conservation characteristics.

The additive may be 1,3-benzene diol (resorcine) resorcinol, phloroglucinol, or 1,2,4-benzene triol. For example, the additive may be phloroglucinol or 1,2,4-benzene triol.

The amount of the additive may be in a range of about 0.001 to about 3 wt %, for example, about 0.05 to about 1 wt %, based on the total weight of the electrolyte.

If the amount of the additive is within the range described above, a SEI film having a small thickness is formed at the surface of a cathode by oxidation during initial charging of a lithium secondary battery and, thus, lithium ions more easily migrate through the SEI film.

The non-aqueous organic solvent included in the electrolyte for a lithium secondary battery may be, for example, as described above, a carbonate-based solvent, an ester-based solvent, an ether-based solvent, a ketone-based solvent, an alcohol-based solvent, a non-protonic solvent, or a combination thereof.

Examples of a carbonate-based solvent include dimethyl carbonate (DMC), diethyl carbonate (DEC), dipropyl carbonate (DPC), methylpropyl carbonate (MPC), ethyl propyl carbonate (EPC), ethyl methyl carbonate (methyl ethyl carbonate, EMC or MEC), ethylene carbonate (EC), propylene carbonate (PC), 1,2-butylene carbonate and trans-2,3-butylene carbonate (BC). Examples of an ester-based solvent include methyl acetate, ethyl acetate, n-propyl acetate, 1,1-dimethyl ethyl acetate, methyl propionate, ethyl propionate, γ-butyrolactone, 5-decanolide, γ-valerolactone, dl-mevalonolactone, and γ-caprolactone. Examples of an ether-based solvent include dibutyl ether, tetraglyme, diglyme, dimethoxyethane, 2-methyl tetrahydrofuran, and tetrahydrofuran. Examples of a ketone-based solvent include cyclohexanone.

Examples of an alcohol-based solvent include ethyl alcohol and isopropyl alcohol. Examples of a non-protonic solvent include nitriles represented by R—CN where R is a linear, branched, or cyclic hydrocarbonyl group having 2 to 20 carbons, and R may have a double bond aromatic ring or an ether bond; amides such as dimethyl formamide; dioxolanes such as 1,3-dioxolane; and sulfolanes.

The non-aqueous organic solvents may be used alone or in combination. If the non-aqueous organic solvents are used in combination, a mixed ratio may be appropriately controlled according to the required performance of the battery to be manufactured and may be obvious to one of ordinary skill in the art.

Also, if the carbonate-based solvent is used, a cyclic carbonate and a chain carbonate may be used in combination. In this case, the volumetric ratio of the cyclic carbonate to the chain carbonate may be in the range of about 1:1 to about 1:9. If the volumetric ratio of a cyclic carbonate to a chain carbonate is within the range described above, an electrolyte including the carbonate-based solvent has good performance.

The non-aqueous organic solvent may further include, in addition to the carbonate-based solvent, an aromatic hydrocarbon-based organic solvent. In this regard, the carbonate-based solvent may be mixed with the aromatic hydrocarbon-based organic solvent in a volumetric ratio of about 1:1 to about 30:1.

The aromatic hydrocarbon-based organic solvent may be an aromatic hydrocarbon-based compound represented by Formula 2 below:

[Formula 2]

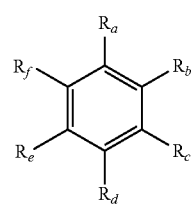

where $R_a$ through $R_f$ are each independently a hydrogen atom, a halogen atom, a C1 to C10 alkyl group, a haloalkyl group, or a combination thereof.

Examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2- dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene (mixed isomers), and a combination thereof.

A lithium secondary battery including an electrolyte according to an embodiment of the present invention will now be described in detail.

The lithium secondary battery includes a cathode, an anode, and an electrolyte, in which the electrolyte includes a lithium salt, a non-aqueous organic solvent, and an additive represented by Formula 1 below:

[Formula 1]

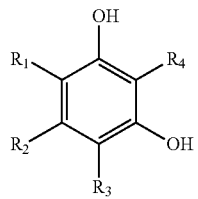

where $R_1$, $R_2$, $R_3$, and $R_4$ are each independently a hydrogen atom, a halogen element, a hydroxyl group, —N(R)(R') (R and R' are each independently a hydrogen atom, a C1-C10 alkyl group, or a C6-C20 aryl group), an ester group, a carbonate group, a carbonyl group, a nitro group, a cyano group, a thio group, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a C2-C20 alkylene oxide group, a substituted or unsubstituted C3-C30 cycloalkyl group, a substituted or unsubstituted C6-C30 aryl group, a substituted or unsubstituted C6-C30 aryloxy group, a substituted or unsubstituted C6-C30 heteroaryl group, or a combination thereof.

A lithium secondary battery according to another embodiment of the present invention includes a cathode, an anode, and an electrolyte, in which the electrolyte includes a lithium salt, a non-aqueous organic solvent, and an additive represented by Formula 1, the cathode includes a film formed at a surface of the cathode, and the film is derived from a portion of the additive or the entire additive.

When the lithium secondary batteries are charged or discharged, the additive undergoes oxidative polymerization to form a film at the surface of a cathode. That is, one or more —OH groups in the benzene ring in Formula 1 become —O. by a radical initiator, and —O. is connected to adjacent aromatic carbon by C—O coupling, and then, a chain-reaction polymerization occurs.

That is, the film is a product of oxidative polymerization of the additive.

Examples of the radical initiator include an organic peroxide, a hydro peroxide, an azo compound, a persulfate-reducing agent, a redox agent such as a hydroperoxide-$Fe^{2+}$, an organic metal reagent such as alkylated silver, and irradiation of heat, light, ultraviolet light, or high energy. However, the radical initiator is not limited thereto.

Thus, even when the lithium secondary batteries are charged at a high voltage higher than 4.3 V, the lithium secondary batteries have excellent capacity retention characteristics.

Also, even when the lithium secondary batteries are exposed to high temperature, the secondary lithium batteries have excellent lifetime characteristics and excellent capacity conservation characteristics.

In the lithium secondary batteries according to embodiments of the present invention, the thickness of the film formed at the surface of the cathode may be in a range of about 0.05 nm to about 100 nm. For example, the thickness of the film may be in a range of about 0.1 nm to about 80 nm. For example, the thickness of the film may be in a range of about 0.5 nm to 50 nm.

If the thickness of the film formed at the surface of the cathode included in the lithium secondary batteries is within the range described above, the film may adversely affect migration of lithium ions and oxidation of the electrolyte at the surface of the cathode may be effectively prevented.

Figure 2:
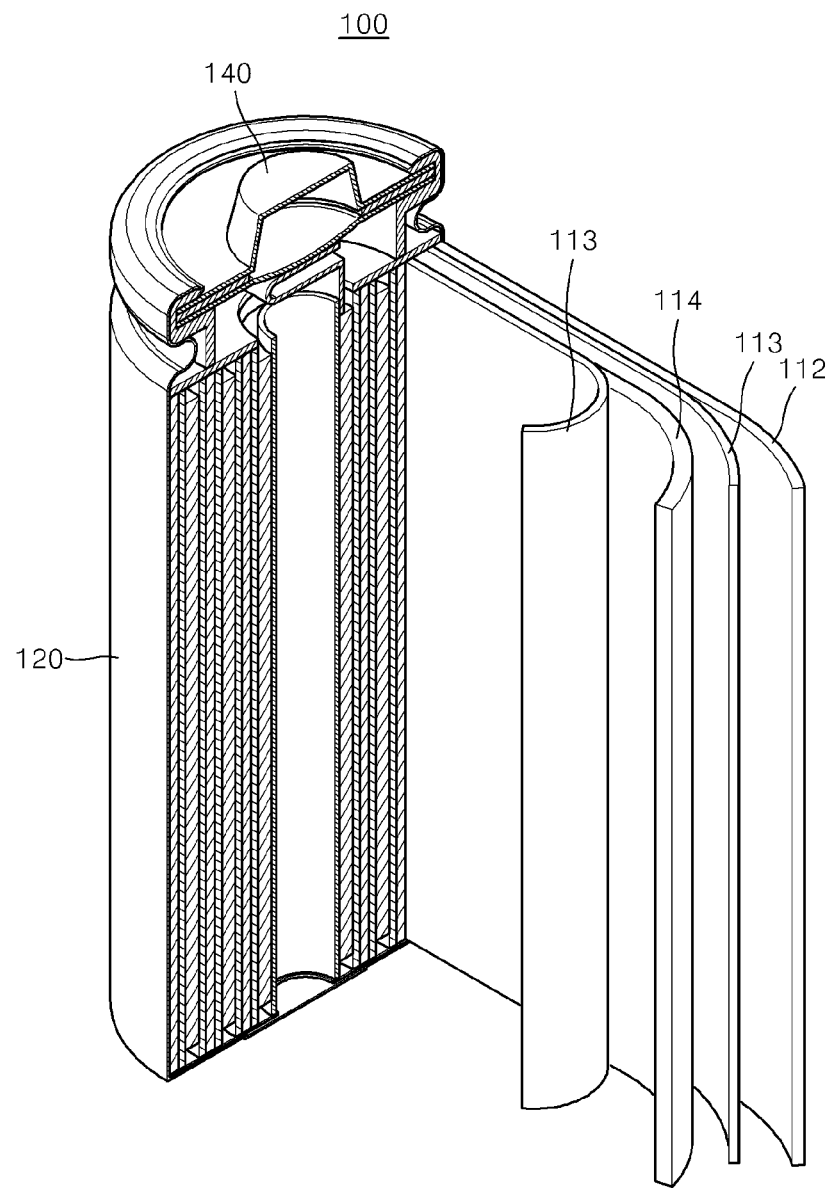
FIG. 2 is an exploded perspective view of a lithium secondary battery according to another embodiment of the present invention.

FIG. 2 is an exploded perspective view of a lithium secondary battery 100 according to an embodiment of the present invention. The lithium secondary battery of FIG. 2 is cylindrical, but the shape of the lithium secondary battery is not limited thereto. For example, the lithium secondary battery may instead have a rectangular shape or a pouch shape.

Lithium secondary batteries can be classified as a lithium ion battery, a lithium ion polymer battery, or a lithium polymer battery, according to the separator and the electrolyte; can be classified as a cylindrical battery, a rectangular battery, a coin-type battery, or a pouch-type battery, according to the shape of a battery; and can be classified as a large battery or a film-type battery, according to the size of the battery. The type of a lithium secondary battery according to this embodiment of the present invention is not limited. The structures and preparation methods of the batteries described above are known in the art and thus, will not be described in detail herein.

Referring to FIG. 2, the lithium secondary battery 100 is cylindrical, and includes an anode 112, a cathode 114, a separator 113 interposed between the anode 112 and the cathode 114, an electrolyte (not shown) with which the anode 112, the cathode 114, and the separator 113 are impregnated, a battery container 120, and an encapsulation member 140 for encapsulating the battery container 120. The anode 112, cathode 114, and the separator 113 are sequentially deposited and then wound in a jelly-roll form and then, the wound structure is placed in the battery container 120, thereby manufacturing the lithium secondary battery 100.

The anode 112 includes a current collector and an anode active material layer formed on the current collector, in which the anode active material layer includes an anode active material.

As a current collector for an anode, according to the voltage range, a copper, nickel, or SUS current collector may be used. For example, a copper current collector may be used as a current collector for an anode.

The anode active material may be any material that is conventionally used in the art. For example, examples of the anode active material include lithium metal, a metal material that is alloyable with lithium, a transition metal oxide, a material for doping or undoping lithium, and a material for reversibly intercalating or deintercalating lithium ions.

Examples of a transition metal oxide include vanadium oxide, lithium vanadium oxide, etc. Examples of a material for doping or undoping lithium include Si; $SiO_x$ (0<x<2); Si-T alloy where T is an alkali metal, an alkali earth metal, a Group 13 element, a Group 14 element, a transition metal, a rare-earth element, or a combination thereof and is not Si; Sn; $SnO_2$; and Sn—Z where Z is an alkali metal, alkali earth metal, a Group 13 element, a Group 14 element, a transition metal, a rare-earth element, a combination thereof, etc., and is not Sn. Also, at least one of the materials for doping or undoping lithium may be used in combination with $SiO_2$. The elements T or Z may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

A material for reversibly intercalating or deintercalating lithium ions may be a carbonaceous material and any one of various carbonaceous anode active materials that are conventionally used in a lithium ion secondary battery. Examples of a material for reversibly intercalating or deintercalating lithium are crystalline carbon, amorphous carbon, and a combination thereof. Examples of crystalline carbon are natural graphite and artificial graphite, each of which has an amorphous shape, a plate shape, a flake shape, a spherical shape, or a fiber shape. Examples of amorphous carbon are soft carbon (low-temperature calcined carbon), hard carbon, meso-phase pitch carbide, and calcined coke.

The anode active material layer may also include a binder, and may further selectively include a conductive agent.

The binder may allow anode active material particles to be attached to each other and the anode active material to be attached to the current collector. Examples of the binder are polyvinylalcohol, carboxymethylcellulose, hydroxypropylcellulose, diacetylcellulose, polyvinylchloride, carboxylated polyvinylchloride, polyvinylfluoride, ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, and nylon. However, the binder is not limited thereto.

The conductive agent provides conductivity to the anode 112, and may be any one of various materials that do not cause any chemical change in the lithium secondary battery 100 and are electronically conductive. Examples of the conductive agent are natural graphite, artificial graphite, carbon black, acetylene black, ketjen black, carbon fiber, and metal powder or fiber of copper, nickel, aluminum, or silver. Also, the conductive agents may also be at least one polyphenylene derivative. Examples of the current collector are a copper foil, a nickel foil, a stainless steel foil, a titanium foil, nickel foam, copper foam, a polymer substrate coated with a conductive metal, and a combination thereof.

Amounts of the anode active material, the binder, and the conductive agent may be used at the same levels as conventionally used in a lithium secondary battery. For example, the weight ratio of the anode active material to the sum of the conductive agent and the binder may be in a range of about 98:2 to about 92:8, and the mixed ratio of the conductive agent and the binder may be in a range of about 1:1.5 to about 1:3. However, the ratios are not limited thereto.

The cathode 114 includes a current collector, and a cathode active material layer formed on the current collector, in which the cathode active material, layer includes a cathode active material.

The current collector may be formed of Al, but a material for forming a current collector is not limited thereto.

The cathode active material may be any one of various materials that are conventionally used in the art. For example, the cathode active material may be a compound that enables reversible intercalation and deintercalation of lithium. The cathode active material may include one or more composite oxides of lithium and a metal selected from the group consisting of cobalt, manganese, nickel, and a combination thereof. Examples of the cathode active material are compounds represented by $Li_aA_{1-b}B_bD_2$ where $0.90 \le a \le 1.8$, and $0 \le b \le 0.5$; $Li_aE_{1-b}B_bO_{2-c}D_c$ where $0.90 \le a \le 1.8$, $0 \le b \le 0.5$, and $0 \le c \le 0.05$; $LiE_{2-b}B_bO_{4-c}D_c$ where $0 \le b \le 0.5$, and $0 \le c \le 0.05$; $Li_aNi_{1-b-c}Co_bB_cD_\alpha$ where $0.90 \le a \le 1.8$, $0 \le b \le 0.5$, $0 \le c \le 0.05$, and $0 < \alpha \le 2$; $Li_aNi_{1-b-c}Co_bB_cO_{2-\alpha}F_\alpha$ where $0.90 \le a \le 1.8$, $0 \le b \le 0.5$, $0 \le c \le 0.05$, and $0 < \alpha < 2$; $Li_aNi_{1-b-c}Co_bB_cO_{2-\alpha}F_2$ where $0.90 \le a \le 1.8$, $0 \le b \le 0.5$, $0 \le c \le 0.05$, and $0 < \alpha < 2$; $Li_aNi_{1-b-c}Mn_bB_cD_\alpha$ where $0.90 \le a \le 1.8$, $0 \le b \le 0.5$, $0 \le c \le 0.05$, and $0 < \alpha \le 2$; $Li_aNi_{1-b-c}Mn_bB_cO_{2-\alpha}F_\alpha$ where $0.90 \le a \le 1.8$, $0 \le b \le 0.5$, $0 \le c \le 0.05$, and $0 < \alpha < 2$; $Li_aNi_{1-b-c}Mn_bB_cO_{2-\alpha}F_2$ where $0.90 \le a \le 1.8$, $0 \le b \le 0.5$, $0 \le c \le 0.05$, and $0 < \alpha < 2$; $Li_aNi_bE_cG_dO_2$ where $0.90 \le a \le 1.8$, $0 \le b \le 0.9$, $0 \le c \le 0.5$, and $0.001 \le d \le 0.1$; $Li_aNi_bCo_cMn_dGeO_2$ where $0.90 \le a \le 1.8$, $0 \le b \le 0.9$, $0 \le c \le 0.5$, $0 \le d \le 0.5$, and $0.001 \le e \le 0.1$; $Li_aNiG_bO_2$ where $0.90 \le a \le 1.8$, and $0.001 \le b \le 0.1$; $Li_aCOG_bO_2$ where $0.90 \le a \le 1.8$, and $0.001 \le b \le 0.1$; $Li_aMnG_bO_2$ where $0.90 \le a \le 1.8$, and $0.001 \le b \le 0.1$; $Li_aMn_2G_bO_4$ where $0.90 \le a \le 1.8$, and $0.001 \le b \le 0.1$; $QO_2$; $QS_2$; $LiQS_2$; $V_2O_5$; $LiV_2O_5$; $LiIO_2$; $LiNiVO_4$; $Li_{(3-f)}J_2(PO_4)_3 (0 \le f \le 2)$; $Li_{(3-f)}Fe_2(PO_4)_3 (0 \le f \le 2)$; and $LiFePO_4$.

For example, the cathode active material may be $LiMn_2O_4$, $LiNi_2O_4$, $LiCoO_2$, $LiNiO_2$, $LiMnO_2$, $Li_2MnO_3$, $LiFePO_4$, or $LiNi_xCo_yO_2$ ($0 < x \le 0.15$, $0 < y \le 0.85$).

In the formulas above, A is Ni, Co, Mn, or a combination thereof; B is Al, Ni, Co, Mn, Cr, Fe, Mg, Sr, V, a rare-earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

The compounds described above may have a coating layer at their surfaces. Alternatively, the compounds may instead be used in combination with a compound including a coating layer. The coating layer may include a coating element compound, such as an oxide of a coating element, a hydroxide of a coating element, an oxyhydroxide of a coating element, an oxycarbonate of a coating element, or a hydroxy carbonate of a coating element. The coating element compounds may be amorphous or crystalline. The coating element included in the coating layer may be Mg, Al, Co, K, Na, Ca, Si, Ti, V, Sn, Ge, Ga, B, As, Zr, or a mixture thereof. The coating layer may be formed by using any one of various methods that use the coating elements and do not adversely affect properties of a cathode active material (for example, spray coating or immersion). The coating layer formation methods may be obvious to one of ordinary skill in the art and thus, will not be described in detail.

The cathode active material layer may further include a binder and a conductive agent.

The binder may allow cathode active material particles to be attached to each other and the cathode active material to be attached to the current collector. Examples of the binder are polyvinylalcohol, carboxymethylcellulose, hydroxypropylcellulose, diacetylcellulose, polyvinylchloride, carboxylated polyvinylchloride, polyvinylfluoride, ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, and nylon. However, the binder is not limited thereto.

The conductive agent provides conductivity to the cathode 114, and may be any one of various materials that do not cause any chemical change in the lithium secondary battery 100 and are electronically conductive. Examples of the conductive agent are natural graphite, artificial graphite, carbon black, acetylene black, ketjen black, carbon fiber, and metal powder or fiber of copper, nickel, aluminum, or silver. Also, the conductive agents may also be at least one polyphenylene derivative.

Amounts of the cathode active material, the binder, and the conductive agent may be used at the same levels as conventionally used in a lithium secondary battery. For example the weight ratio of the cathode active material to the sum of the conductive agent and the binder may be in a range of about 98:2 to about 92:8, and the mixed ratio of the conductive agent to the binder may be in a range of about 1:1.5 to about 1:3. However, the ratios may not be limited thereto.

In order to form an electrode such as the anode 112 and the cathode 114, an active material, a binder, and a conductive agent are mixed in a solvent to prepare an active material composition and a current collector is doped with the active material composition. This electrode manufacturing method is known in the art and, thus, will not be described in detail herein. The solvent may be N-methylpyrrolidone, but is not limited thereto.

According to the type of a lithium secondary battery, a separator may be present between an anode and a cathode. The separator may include single or multi-layer polyethylene, polypropylene, or polyvinylidene fluoride. Also, the separator may include a mixed multi-layer, such as a polyethylene/polypropylene layer, a polyethylene/polypropylene/polyethylene layer, or a polypropylene/polyethylene/polypropylene layer.

One or more embodiments will now be described in further detail with reference to the following examples. These examples are for illustrative purposes only and are not intended to limit the scope of the one or more embodiments.

In addition, information that is known to one of ordinary skill in the art is not provided herein.

EXAMPLES

Example 1

Preparation of Electrolyte for Lithium Secondary Battery

An electrolyte for a lithium secondary battery was prepared by adding 0.1 wt % of resorcinol as an additive and 1.3 M $LiPF_6$ as a lithium salt to a mixed organic solvent including 30 volume % of ethylene carbonate, 50 volume % of diethyl carbonate, and 20 volume % of ethyl methyl carbonate.

Example 2

Preparation of Electrolyte for Lithium Secondary Battery

An electrolyte for a lithium secondary battery was prepared in the same manner as in Example 1, except that 0.1 wt % of phloroglucinol was used as an additive instead of resorcinol.

Example 3

Preparation of Electrolyte for Lithium Secondary Battery

An electrolyte for a lithium secondary battery was prepared in the same manner as in Example 1, except that 1 wt % of phloroglucinol was used as an additive instead of resorcinol.

Comparative Example 1

Preparation of Electrolyte for Lithium Secondary Battery

An electrolyte for a lithium secondary battery was prepared using 1.3 M $LiPF_6$ as a lithium salt and a mixed organic solvent including 30 volume % of ethylene carbonate, 50 volume % of diethyl carbonate, and 20 volume % of ethyl methyl carbonate. In this experiment, an additive was not used.

Comparative Example 2

Preparation of Electrolyte for Lithium Secondary Battery

An electrolyte for a lithium secondary battery was prepared in the same manner as in Example 1, except that 0.1 wt % of phenol was used as an additive instead of resorcinol.

Comparative Example 3

Preparation of Electrolyte for Lithium Secondary Battery

An electrolyte for a lithium secondary battery was prepared in the same manner as in Example 1, except that 1 wt % of phenol was used as an additive instead of resorcinol.

Example 4

Manufacturing of Lithium Secondary Battery $Li_{1+x}(Ni,Co,Mn)_{1-x}O_2$ powder as a cathode active material, a binder prepared by dissolving 5 wt % of polyvinylidene fluoride (PVdF) in N-methylpyrrolidone (NMP), and a conductive agent (Denka black) were added in a weight ratio of 92:4:4 to an agate mortar and mixed to prepare a slurry. The slurry was coated on an aluminum foil having a thickness of 15 μm by bar coating. The resultant product was placed in an oven at a temperature of 90° C. and dried for about 2 hours to evaporate NMP, and then placed in a vacuum oven at a temperature of 120° C. and dried for about 2 hours to completely evaporate NMP. Then, the resultant product was pressed and punched to obtain a cathode for a coin cell having a thickness of 60 μm. The capacity of the cathode was about 1.7 mAh/$cm^2$, and the thickness of the cathode was in a range of about 50 to about 60 μm.

A coin-type lithium secondary battery was manufactured by using a cathode having a diameter of 1.5 cm, a graphite anode having a diameter of 1.6 cm, and a polyethylene separator, the electrolyte of Example 1.

Examples 5 and 6

Manufacturing of Lithium Secondary Batteries

Coin-type lithium secondary batteries were manufactured in the same manner as in Example 4, except that the electrolytes of Examples 2 and 3 were used.

Comparative Examples 4 through 6

Manufacturing of Lithium Secondary Batteries

Coin-type lithium secondary batteries were manufactured in the same manner as in Example 4, except that the electrolytes of Comparative Examples 1 to 3 were used.

Experimental Example 1

Charge and Discharge Test for Lithium Secondary Battery

The coin-type lithium secondary batteries manufactured according to Examples 4 to 6 and Comparative Examples 4 through 6 underwent charging and discharging for formation twice at room temperature. In the first formation process, the coin-type lithium secondary batteries were charged with a constant current of 0.2 C until the voltage reached 4.4 V and then charged at a constant voltage until the current reached 0.05 C. Then, discharging was performed with a constant current of 0.2 C until the voltage reached 2.8 V. The second formation process was the same as the first formation process. The coin-type lithium secondary battery that underwent the charging and discharging for formation was charged with a current of 0.5 C in the method described above and then discharged with a current of 0.2 C until the voltage reached 2.8 V. The charging and discharging conditions in this case were used as reference charging and discharging conditions, and the discharge capacity in this case was used as a reference capacity.

Then, the coin-type lithium secondary batteries were charged with a current of 1 C in a constant-temperature chamber at a temperature of 60° C. in the method described above and then, discharged with a current of 1 C until the voltage reached 2.8 V. In this case, the discharge capacity (discharge capacity in the second cycle) was measured. The charging and discharging were repeatedly performed to evaluate a cycle lifetime. The discharge capacity of the coin-type lithium secondary batteries in each cycle was measured, and a cycle retention rate was calculated therefrom. The cycle retention rate (%) is calculated using Equation 1 below:

Cycle Retention Rate (%)=discharge capacity in $n^{th}$ cycle/discharge capacity in $2^{th}$ cycle  [Equation 1]

The cycle retention rate calculated as described above is shown in Table 1 below and in FIG. 3.

TABLE 1

| | Example 4 | Example 5 | Example 6 | Comparative Example 4 | Comparative Example 5 | Comparative Example 6 |
|---|---|---|---|---|---|---|
| Discharge capacity in $2^{th}$ cycle (mAh) | 2.16 | 2.46 | 2.25 | 2.50 | 2.74 | 2.18 |
| Discharge capacity in $70^{th}$ cycle (mAh) | 2.04 | 2.32 | 1.98 | 2.31 | 2.48 | 1.77 |
| Cycle retention rate (%) | 94.9 | 94.5 | 87.8 | 92.4 | 90.4 | 81.1 |

Figure 3:
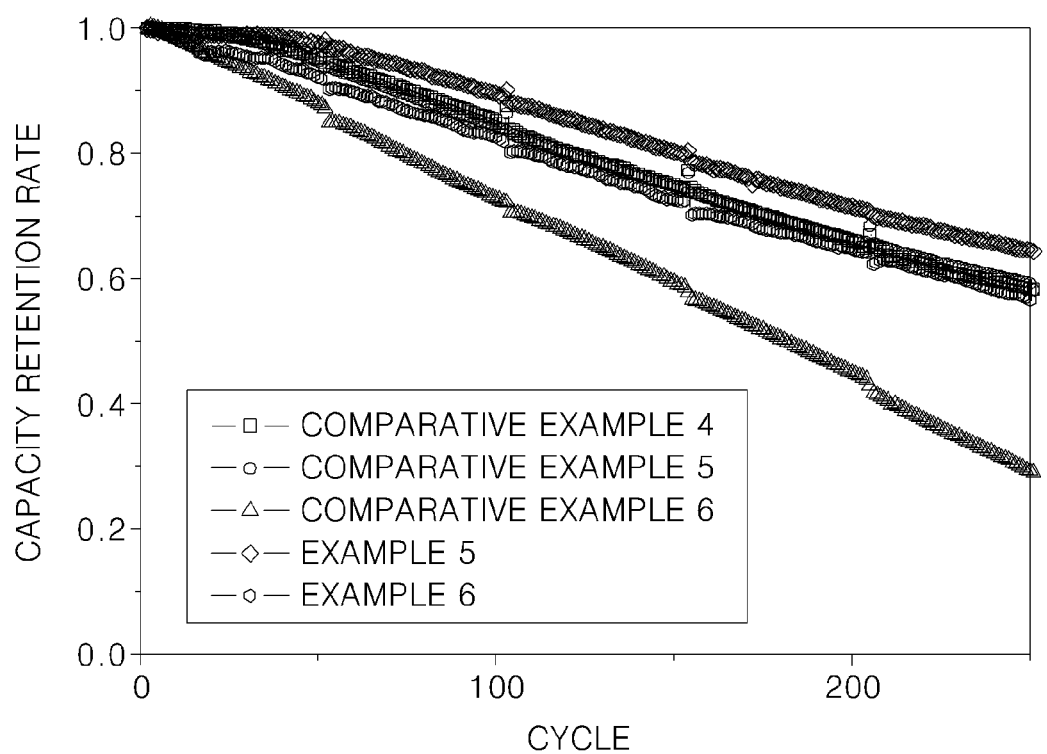
FIG. 3 is a graph showing high-temperature lifetime characteristics of lithium secondary batteries manufactured according to Examples 5 and 6 and Comparative Examples 4 through 6.

Referring to Table 1 and FIG. 3, the coin-type lithium secondary batteries of Examples 4 to 6 had higher cycle retention rates than the coin-type lithium secondary batteries of Comparative Examples 4 to 6 in the $70^{th}$ cycle from the initial capacity. Regarding the coin-type lithium secondary battery of Comparative Example 4 that did not include an additive, the capacity began to decrease from about the $30^{th}$ cycle, and regarding the coin-type lithium secondary batteries of Comparative Examples 5 and 6 that included phenol, the capacity began to decrease from about the $20^{th}$ cycle. However, regarding the coin-type lithium secondary batteries of Examples 4 and 5, a high capacity was maintained up to the $70^{th}$ cycle.

Batteries that underwent charging and discharging twice and a reference charging and discharging once under the reference charging and discharging conditions were left at a temperature of 90° C. for about 4 hours, and then discharge capacities thereof (discharge capacity after exposure to high temperature) were measured.

Figure 4:
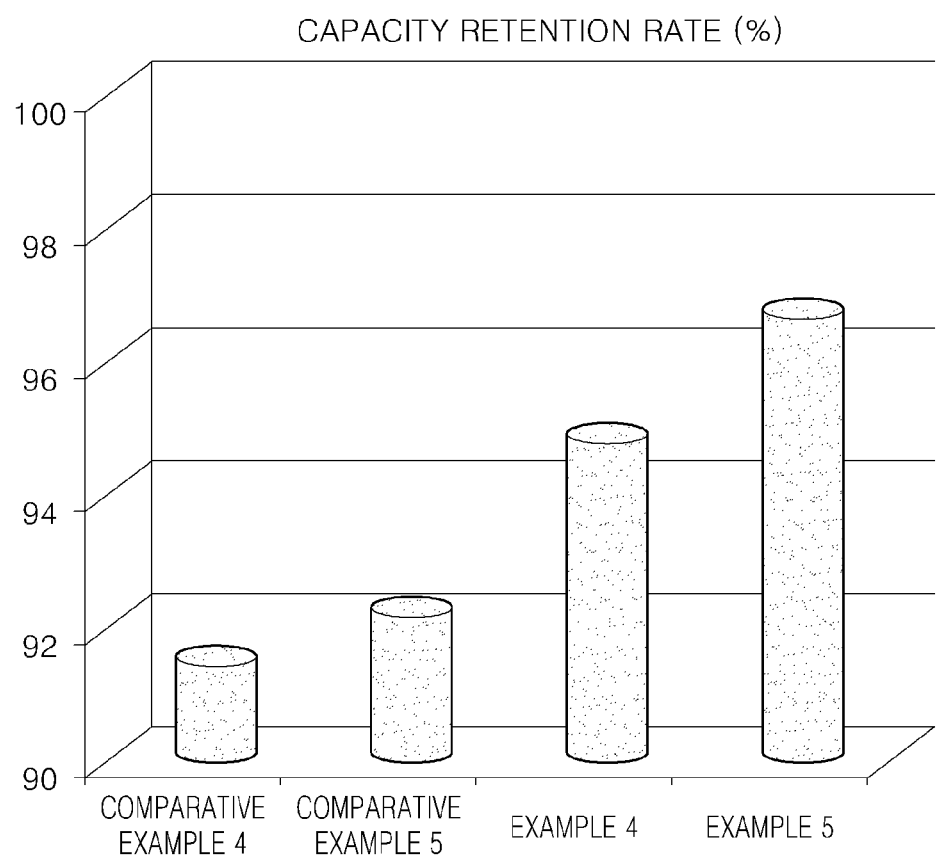
FIG. 4 is a graph of capacity retention rates of lithium secondary batteries manufactured according to Examples 4 and 5 and Comparative Examples 4 and 5 after the lithium secondary batteries are exposed to high temperature.

The high-temperature capacity retention rates are shown in Table 2 and in FIG. 4.

The high-temperature capacity retention rates (%, retention) are calculated by using Equation 2 below.

High-temperature capacity retention rate (%)=discharge capacity after exposure to high temperature/reference capacity  [Equation 2]

TABLE 2

| | Example 4 | Example 5 | Comparative Example 4 | Comparative Example 5 |
|---|---|---|---|---|
| Reference Capacity | 2.47 | 2.41 | 2.61 | 2.46 |
| Discharge capacity after exposure to high temperature (mAh) | 2.35 | 2.34 | 2.40 | 2.29 |
| High-temperature capacity retention rate (%) | 94.5 | 97.4 | 91.8 | 92.9 |

Referring to Table 2 and FIG. 4, when the coin-type lithium secondary batteries of Examples 4 and 5 are exposed at a temperature of 90° C. for about 4 hours, the discharge capacity after exposure to high temperature was higher than when the coin-type lithium secondary batteries of Comparative Examples 4 and 5 were exposed under the same conditions. Thus, it was confirmed that the high-temperature capacity retention rate of the coin-type lithium secondary batteries of Examples 4 and 5 was higher than the high-temperature capacity retention rate of the coin-type lithium secondary batteries of Comparative Examples 4 and 5.

That is, the capacity retention rates of Examples 4 and 5 were in the range of about 94 to 97%, and the capacity retention rates of Comparative Examples 4 and 5 were in the range of about 92 to about 93%.

An electrolyte for a lithium secondary battery forms a thin polar SEI film at the surface of a cathode of a battery to prevent decomposition and consumption of the electrolyte. Thus, when the electrolyte is used in a battery, the battery may have excellent capacity retention characteristics at high voltage and excellent capacity conservation at high temperature. An improvement in high-temperature lifetime characteristics enables a battery including the electrolyte to be available in an electric vehicle exposed to harsh conditions, and an improvement in high-temperature capacity conservation characteristics makes a battery including the electrolyte be more suitable for power storage applications that are likely to be exposed to high temperature. Also, in the future, the electrolyte will be used in a battery including a cathode active material to which a high voltage is applied, for example, a 5 V spinel, high-voltage phosphate cathode active material. Thus, it is expected that the electrolyte may contribute to an improvement in energy density of batteries for electric vehicles and power storage.

As described above, the electrolytes for a lithium secondary battery according to the one or more of the above embodiments of the present invention may form a thin polar SEI film at the surface of a cathode. Thus, when the electrolyte is used in a battery, the battery has high-temperature lifetime characteristics and high-temperature capacity conservation characteristics. Also, the battery has high conductivity for lithium ions since the electrolyte has a polar hydroxyl group that enables lithium ions to easily migrate.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A lithium secondary battery comprising: a cathode; an anode; and an electrolyte, wherein the electrolyte comprises a lithium salt, a non-aqueous organic solvent, and an additive represented by Formula 1 below, and wherein the cathode comprises a film formed at the surface of the cathode, wherein the film is derived from either a portion of the additive or the entire additive:

[Formula 1]

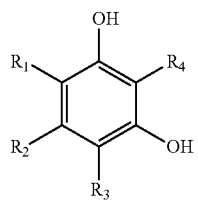

where $R_1$, $R_2$, $R_3$, and $R_4$ are each independently a hydrogen atom, a halogen element, a hydroxyl group, —N(R)(R') (R and R' are each independently a hydrogen atom, a C1-C10 alkyl group, or a C6-C20 aryl group), an ester group, a carbonate group, a carbonyl group, a nitro group, a cyano group, a thio group, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a C2-C20 alkylene oxide group, a substituted or unsubstituted C3-C30 cycloalkyl group, a substituted or unsubstituted C6-C30 aryl group, a substituted or unsubstituted C6-C30 aryloxy group, a substituted or unsubstituted C6-C30 heteroaryl group, or a combination thereof, and wherein at least one of $R_1$, $R_2$, and $R_3$ has a hydroxyl group.

2. The lithium secondary battery of claim 1, wherein the film is an oxidative polymerization product of the additive.

3. The lithium secondary battery of claim 1, wherein the thickness of the film is in the range of about 0.05 nm to about 100 nm.

4. The lithium secondary battery of claim 1, wherein the additive is phloroglucinol or 1, 2,4-benzene triol.

5. The lithium secondary battery of claim 1, wherein the amount of the additive is in the range of about 0.001 to about 3 wt % based on the total weight of the electrolyte.

6. The lithium secondary battery of claim 1, wherein the non-aqueous organic solvent is a carbonate-based solvent, an ester-based solvent, an ether-based solvent, a ketone-based solvent, an alcohol-based solvent, a non-protonic solvent, or a combination thereof.

* * * * *